Nov. 11, 1941.  A. D. KEENE ET AL  2,262,237
ELECTRIC TOASTER CONSTRUCTION
Filed Nov. 12, 1940  2 Sheets-Sheet 1

INVENTORS
ALVIN D. KEENE &
THEODORE S. KREBS
BY
ATTORNEY

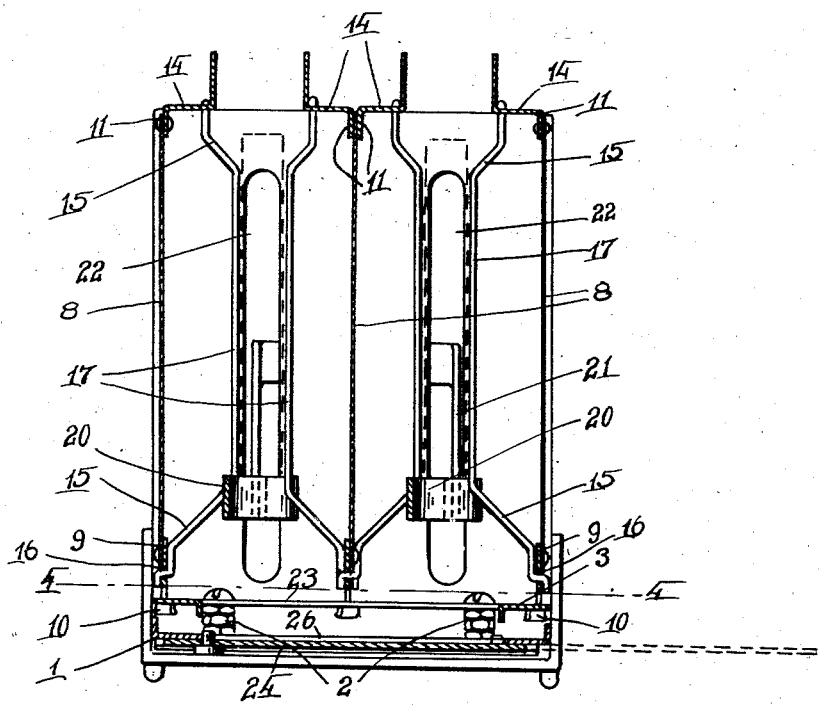
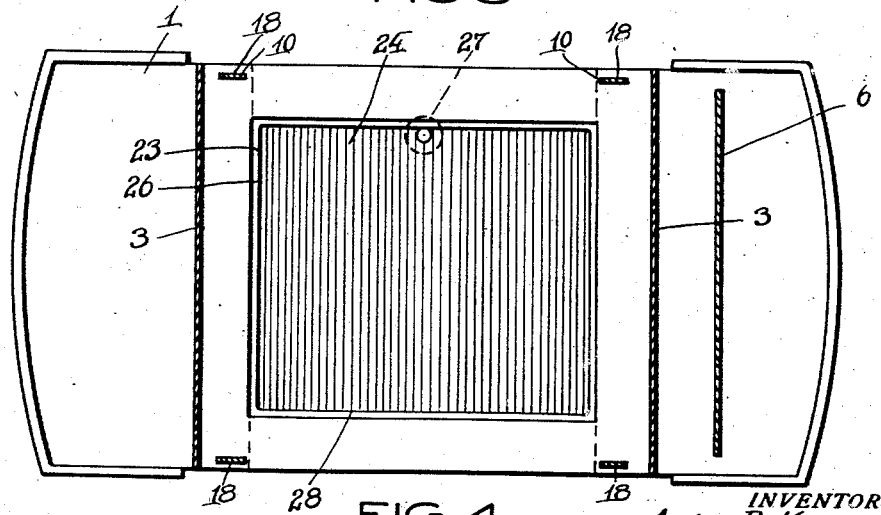

Patented Nov. 11, 1941

2,262,237

UNITED STATES PATENT OFFICE 2,262,237

ELECTRIC TOASTER CONSTRUCTION

Alvin D. Keene and Theodore S. Krebs, Rochester, N. Y., assignors to Samson-United Corporation, Rochester, N. Y., a corporation of Delaware Application November 12, 1940, Serial No. 365,218

4 Claims. (Cl. 219—19)

This invention relates to electric toasters and has for its principal object to provide a novel form of construction in which the parts are adapted for assembly into units of the structure and the units adapted for quick and inexpensive assembly into the finished toaster.

Another object of this invention is to provide the base of the toaster with an opening and a novel door for opening it to prevent accumulation of crumbs in the toaster.

These and other objects and attendant advantages of the invention will become more readily apparent from the detailed description thereof which follows, reference being had to the accompanying drawings in which Figure 1 is a top plan view of the toaster embodying our new construction.

Figure 3 is a vertical sectional view taken on the line 3—3 in Figure 2.

Figure 4 is a horizontal sectional view taken on the line 4—4 in Figure 3.

Figure 1:
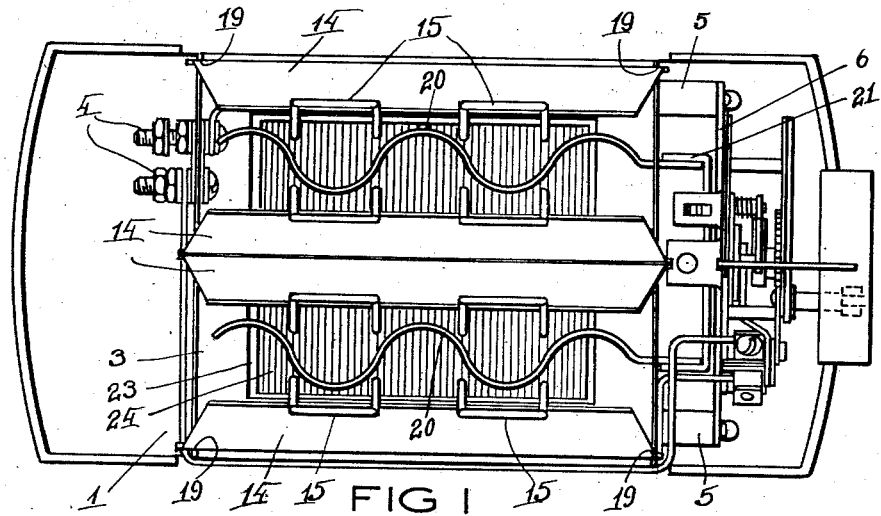

The assembly of an electric toaster is considerably simplified and the cost of the completed toaster materially reduced when portions of the toaster are assembled separately in individual units and these units brought together in a final assembly operation. In this way the units are assembled by operators trained or skilled in particular work and thus accomplish their work faster and better than if they had to assemble the entire toaster and perform some work in which they are not especially skilled.

To make this possible, the toaster construction forming the subject matter of our present invention comprises a base 1 on which is spacedly supported by suitable bolts 2, 2 the substantially U shaped sheet metal frame 3. One side of this frame carries the electric terminals 4, 4 for use in the connection of the heating units. The other side of this frame is provided with the spacing and supporting lugs 5, 5 which are struck out from the frame for the attachment and support of the movement panel 6. This panel is suitably slotted to receive the reduced ends of the lugs 5 so that the cotter pins 7, 7 inserted thru the lugs on the outside of the panel hold the panel anchored to the lugs. The movement panel is thus adapted to provide the support for the entire operating mechanism of the toaster and permits the assembly of this mechanism in a separate unit for quick and easy attachment to the toaster frame by the simple attachment of the panel thereof.

The toaster is provided with three heating units which are individually assembled into units embodying suitable supporting members and guards so that the attachment and anchorage of these units in the frame 3 completes the frame structure of the toaster and holds the heating units and guards properly spaced and arranged within the U shaped metal frame 3.

Each of the units comprises a pair of mica sheets 8, 8 which are suitably notched along the edges to spacedly support the resistance wire 8A thereon. At the bottom each pair of mica sheets is rigidly connected and supported by a cross member 9 which is provided with the anchoring lugs 10, 10. At the top each pair of mica sheets is rigidly connected and supported by a cross member 11 which is provided with anchoring slots 12, 12 near the ends thereof. Each of the cross members 11 has an angular flange 14 which extends horizontally and vertically to provide an opening of reduced width between the outer and inner heating units into which the slice of bread to be toasted is adapted to be inserted.

The vertical portion and part of the horizontal portion of each of the angular flanges 14 of the cross members 11 are slotted to have the wire guards 15 hooked thereinto and then anchored into the slots 16 in the cross member 9. For this purpose, the wire guards are bent into an inverted U shape to have their closed end engage two of the slots in the angular flange 14 as illustrated in Figures 1 and 2, while the free ends are bent for passage thru the slots 16 and engagement with the inside and outside of the cross member 9 for rigid anchorage thereto.

Intermediate portions 17 of the wire guards are offset so that opposing wire guards are properly spaced for the receipt and support of the bread slice between them as illustrated in Figure 3.

Figure 2:
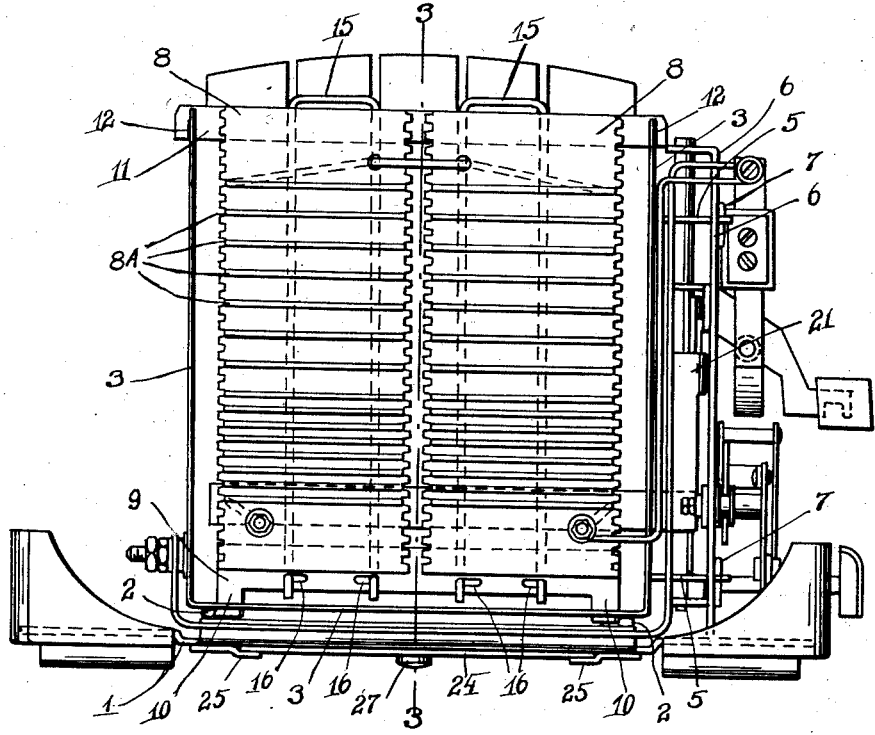
Figure 2 is a side elevation thereof.

The central heating unit is provided at the top with two cross members 11 so that their angular flanges 14, which extend in opposite direction, provide anchorage for two sets of wire guards located opposite to and spaced relative to the wire guards of the outer heating units as illustrated in Figures 1 and 3.

After each heating unit has been separately assembled with the cross member 9 at the bottom, the cross member 11 at the top and the wire guards 15 between them, the anchoring lugs 10, 10 on the cross member 9 are inserted into suitable anchoring slots 18 in the bottom of the U shaped frame 3 and given an angular twist on the outside thereof so as to firmly anchor these lugs in the bottom of the frame 3 and rigidly support the bottom of the heating unit in proper position in the frame 3.

While the lugs 10, 10 are inserted into their anchoring slots in the bottom of the frame 3, the anchoring slots 12, 12 in the ends of the cross members 11 are interlocked with corresponding anchoring slots 19, 19 in the sides of the frame 3 so that anchorage of the bottom of the heating units by means of the lugs 10, 10 automatically anchors and locks the entire heating unit in place in the frame 3.

The bread slice support comprises a pair of narrow members 20, 20 which extend in a serpentine path parallel to each other and are attached with one end to the carrier 21. The latter is vertically movable on the movement panel 6 and is operated and controlled in its movement by a suitable mechanism which forms no part of the present invention. The members 20 extend thru the vertical slots 22 in the side of the U shaped frame 3 and, as illustrated in Figure 1, the curved sections thereof alternately project into the spaces between the wire guards of opposite heating units. In this way each of the serpentine supporting members provides a wide base for the support of a slice of bread between the wire guards and prevents a slice from becoming wedged between its support and the wire guards. Because the curved bends in the supporting members are parallel to each other, these members may be simultaneously inserted thru the slots 22 and between the wire guards prior to the attachment of the movement panel 6 to the frame 1.

In order to permit the discharge of accumulated bread crumbs within the toaster, the frame 1 is cut out at the bottom to provide the opening 23 thru which the crumbs may fall onto the slide 24. The latter is mounted to slide between the guides 25, 25 and normally closes the opening 26 in the base 1. After each use of the toaster or after several uses of the toaster, the slide is moved by means of the knob 27 to uncover the opening in the base and have the edge 28 of the opening scrape the crumbs off the slide for discharge from the toaster.

We claim:

1. In a toaster construction the combination of a base, a substantially U shaped frame spacedly supported on said base, a plurality of heating units comprising a resistance coil, a cross member attached to the top and a cross member attached to the bottom of said resistance coil, wire guards connecting said cross members on one side of said resistance coil, anchoring means carried by said bottom cross member for attachment to the bottom of said frame and anchoring means carried by said top cross member for attachment with the sides of said frame, said heating units being arranged in said frame with the wire guards of one heating unit spacedly opposing the wire guards of the opposing heating unit.

2. In a toaster construction the combination as set forth in claim 1 including a movement panel, a carrier movable on said movement panel, supporting members projecting from said carrier, operating means carried by said movement panel, and means for spacedly attaching said movement panel to one side of said frame for movement of said carrier between said frame and said panel with said supporting members projecting between said wire guards.

3. In a toaster construction the combination as set forth in claim 1 including a movement panel spacedly supported on one side of said frame, a carrier movable on said movement plate between it and the outside of said frame, a pair of narrow, serpentine bent, supporting members projecting from said carrier for vertical movement of the bent portions of said supporting members between alternate spaces of opposing wire guards.

4. In a toaster construction as set forth in claim 1 with an opening in the bottom of said frame substantially in line with an opening in said base, a cover movable on the under side of said base for opening and closing the opening in said base.

ALVIN D. KEENE.
THEODORE S. KREBS.